United States Patent
Diez

(10) Patent No.: US 8,876,075 B2
(45) Date of Patent: Nov. 4, 2014

(54) APPARATUS FOR SUPPORTING MEDICAL EQUIPMENT

(75) Inventor: Ingolf Diez, Tuttlingen (DE)

(73) Assignee: Frowein EZH GmbH, Wuppertal (DE)

( * ) Notice: Subject to any disclaimer, the term of this patent is extended or adjusted under 35 U.S.C. 154(b) by 621 days.

(21) Appl. No.: 12/742,673

(22) PCT Filed: Nov. 6, 2008

(86) PCT No.: PCT/EP2008/009375
§ 371 (c)(1),
(2), (4) Date: Oct. 13, 2010

(87) PCT Pub. No.: WO2009/062628
PCT Pub. Date: May 22, 2009

(65) Prior Publication Data
US 2011/0186701 A1  Aug. 4, 2011

(30) Foreign Application Priority Data

Nov. 15, 2007  (EP) ..................................... 07022261

(51) Int. Cl.
*A47H 1/10*  (2006.01)
(52) U.S. Cl.
USPC ..................... 248/324; 248/274.1; 248/276.1; 248/282.1; 248/317; 248/323
(58) Field of Classification Search
USPC ......... 248/317, 323, 324, 274.1, 276.1, 284.1
See application file for complete search history.

(56) References Cited

U.S. PATENT DOCUMENTS

| 3,584,793 | A | * | 6/1971 | Ilzig et al. | 362/427 |
| 4,029,212 | A | * | 6/1977 | Uadiski | 211/113 |
| 6,030,103 | A |   | 2/2000 | Gampe et al. |  |
| 6,158,360 | A | * | 12/2000 | Cheng | 108/103 |
| 6,196,398 | B1 | * | 3/2001 | Lowe | 211/96 |
| 6,464,383 | B1 | * | 10/2002 | Northington et al. | 362/572 |
| 6,513,962 | B1 | * | 2/2003 | Mayshack et al. | 362/583 |
| 6,568,546 | B1 | * | 5/2003 | Huang | 211/205 |
| 6,601,811 | B1 |   | 8/2003 | Van Lieshout |  |
| 6,639,623 | B2 | * | 10/2003 | Howell et al. | 348/61 |
| 6,698,704 | B2 |   | 3/2004 | Kuhn |  |
| 6,722,511 | B1 | * | 4/2004 | Lowe | 211/119.004 |
| 6,817,585 | B2 | * | 11/2004 | Wagner et al. | 248/324 |
| 7,191,992 | B2 | * | 3/2007 | Wagner et al. | 248/317 |
| 7,921,489 | B2 | * | 4/2011 | Newkirk et al. | 5/600 |

FOREIGN PATENT DOCUMENTS

| DE | 20015399 U1 | 2/2001 |
| EP | 0344658 A2 | 12/1989 |
| EP | 0392303 A1 | 10/1990 |
| FR | 1341061 | 9/1963 |
| JP | 2003-517883 T | 6/2003 |
| WO | 02/14735 A1 | 2/2002 |

OTHER PUBLICATIONS

PCT Search Report, EP, Feb. 3, 2009.

* cited by examiner

*Primary Examiner* — Amy J. Sterling
(74) *Attorney, Agent, or Firm* — Robert R. Deleault, Esq.; Mesmer & Deleault, PLLC

(57) ABSTRACT

An apparatus for supporting medical devices, in particular operation theatre lamps, on the ceiling of an operation theatre uses a vertical pillar 8 at which bearing heads 3 are selectively mounted. Cantilevers of different lengths may be secured at one bearing head 3.

10 Claims, 4 Drawing Sheets

APPARATUS FOR SUPPORTING MEDICAL EQUIPMENT

Figure 1:
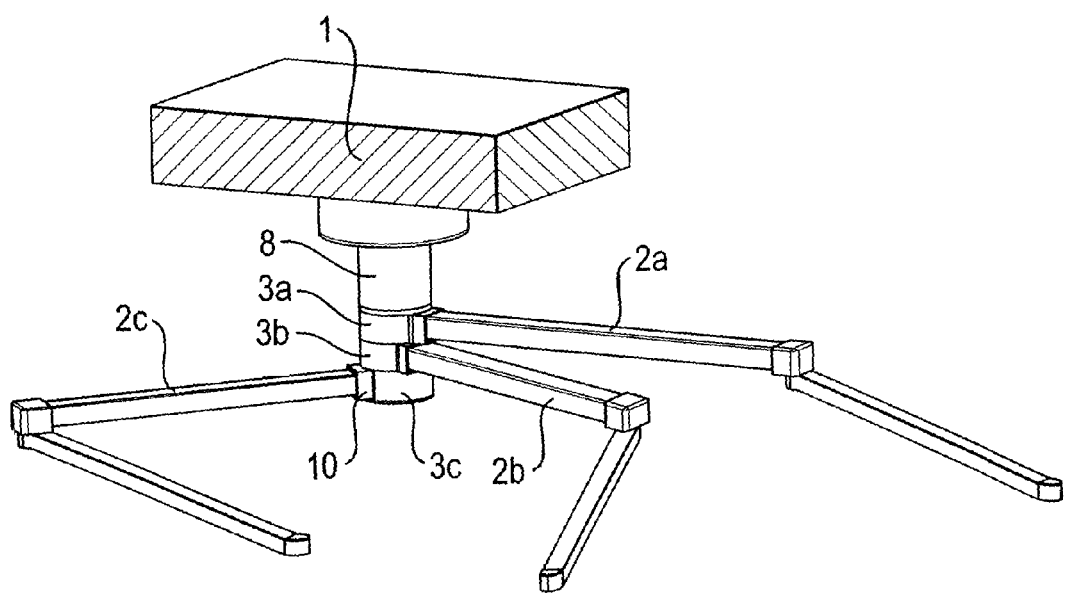

The invention relates to an apparatus for supporting medical devices, in particular, for supporting operation theatre lamps, monitors, or surgical navigation devices. The invention preferably relates to such apparatuses, which comprise a vertical pillar which may be mounted on the ceiling of an operation theatre.

From the state of the art according to EP 0 392 303 A1 such an apparatus is known for supporting an operation theatre lamp, which comprises a vertical pillar which may be mounted at the ceiling of an operation theatre, at which several cantilevers are rotatably attached. Therein, each cantilever carries one operation theatre lamp.

Reference is already made in this prior art that construction and size of operation theatre lamps differ, depending on the application purpose and the spatial conditions, so that for a short-term satisfaction of requirement, the manufacturer has to maintain a considerable inventory with a plurality of supporting apparatuses for operation theatre lamps. Accordingly, the prior art already formulates the object to provide an operation theatre lamp and a support for it which, with a relatively reduced inventory, enables high variability with respect to the construction of the lamp. This prior art, however, requires that the decision and the combination of the individual components of the system comprising the operation theatre lamps and the supporting apparatus has to be made already at the manufacturer's.

In the state of the art according to DE 200 15 399 U1, a bearing sleeve is provided which rotates about a central bearing body. In the embodiment therein according to FIG. 4, the central shafts are not directly connected with each other, in particular, not be screw connections. Rather, the central bearing body extends through all the bearing sleeves, which restricts the variability of the assembly. Prior to the assembly, the length of the central bearing body has to be selected and determined, and this will then be the basis for the number of the bearing sleeves to be assembled one above the other.

It is the object of the present invention to provide an apparatus for supporting medical devices, in particular, operation theatre lamps, which enables a wider variation spectrum with respect to the assembly of the apparatus at its installation site.

For this purpose, the invention provides an apparatus for supporting medical devices, comprising
   a vertical pillar,
   at least one bearing head which is mountable at the vertical pillar, and
   one or more cantilevers which bear against the bearing head,
wherein
   various numbers of bearing heads may selectively be installed in the apparatus.

In the context of this specification, the terms "vertical", "horizontal", "upper", and "lower" or the like are to be interpreted in the sense of the usually intended installation of the apparatus, i. e. in particular at the ceiling of an operation theatre or the like.

According to the invention, the apparatus for supporting e. g. several operation theatre lamps and a number of cantilevers of different lengths is provided a system, which are then selected and assembled at the installation site of the apparatus depending on the prevailing conditions. This selection may relate both to the length and to the number of the employed cantilevers. The number may be varied in that two or more bearing heads may selectively be assembled below one another and together with one another.

According to the invention, a system is provided comprising bearing heads at which cantilevers of different lengths are mounted so that bearing heads with cantilevers of suitable lengths may then selectively be combined on site according to the prevailing conditions and installed at the ceiling.

In another preferred variant of the invention, each bearing head is associated with a shaft, about which the bearing head is rotatable. Preferably, one shaft each may be securely connected to a shaft arranged above it. Depending on the number of the shafts or bearing heads, respectively, which are installed on site, the number of cantilevers to be employed may be varied.

In a preferred embodiment, one bearing head each comprises a collet into which a cantilever may be inserted by a short distance and then be mounted at the bearing head by means of a fastening means, such as one or several screws.

Figure 2:
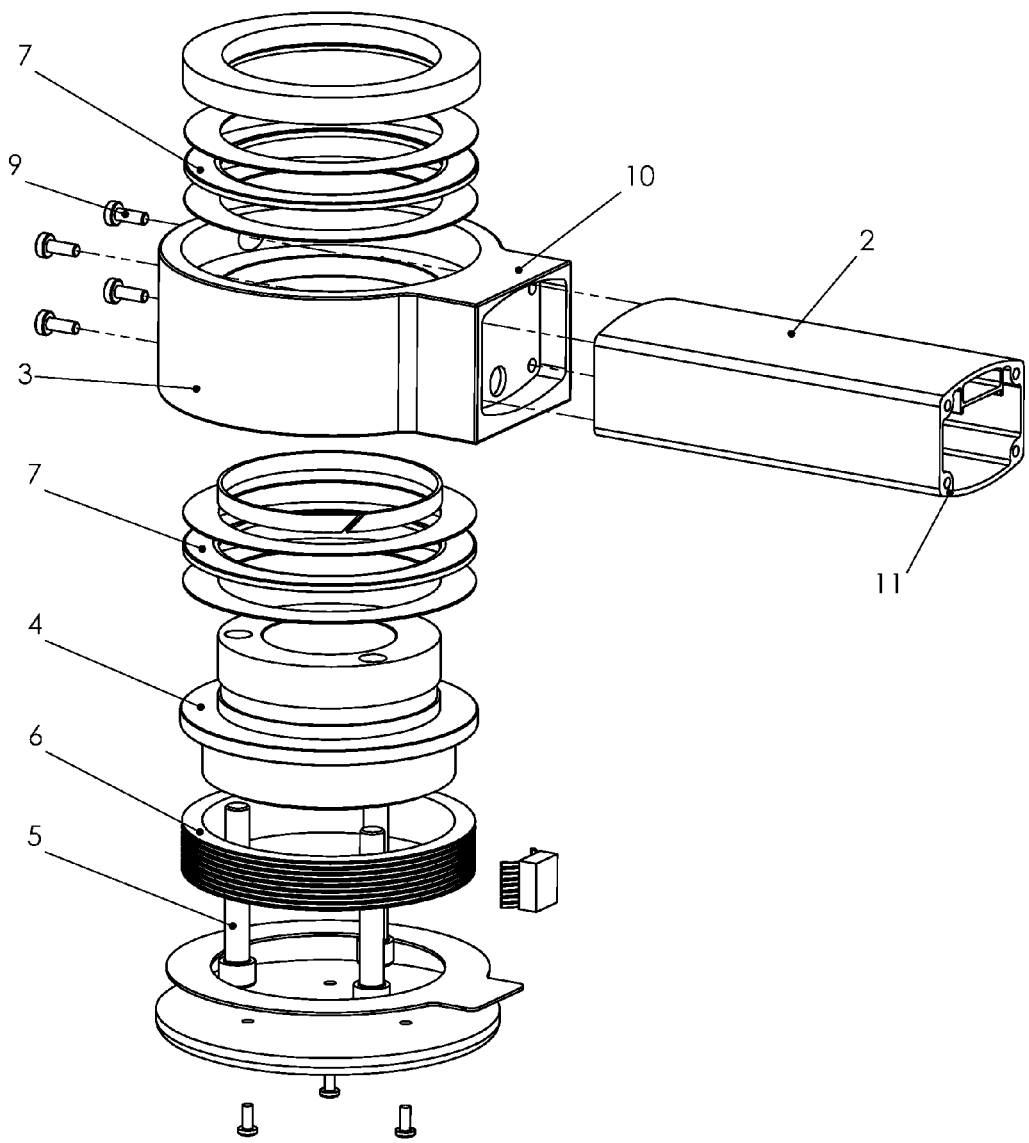
Figure 3:
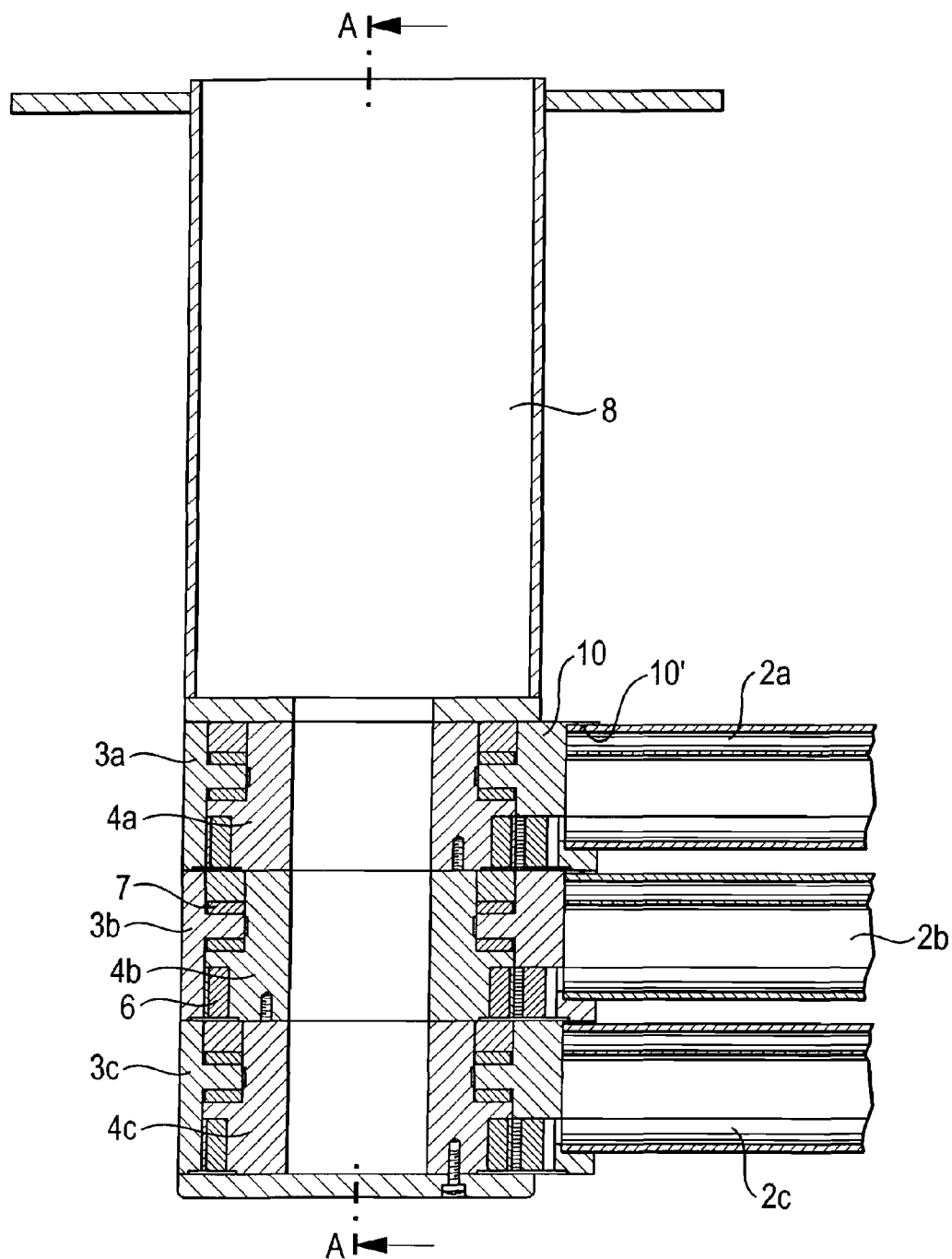
Figure 4:
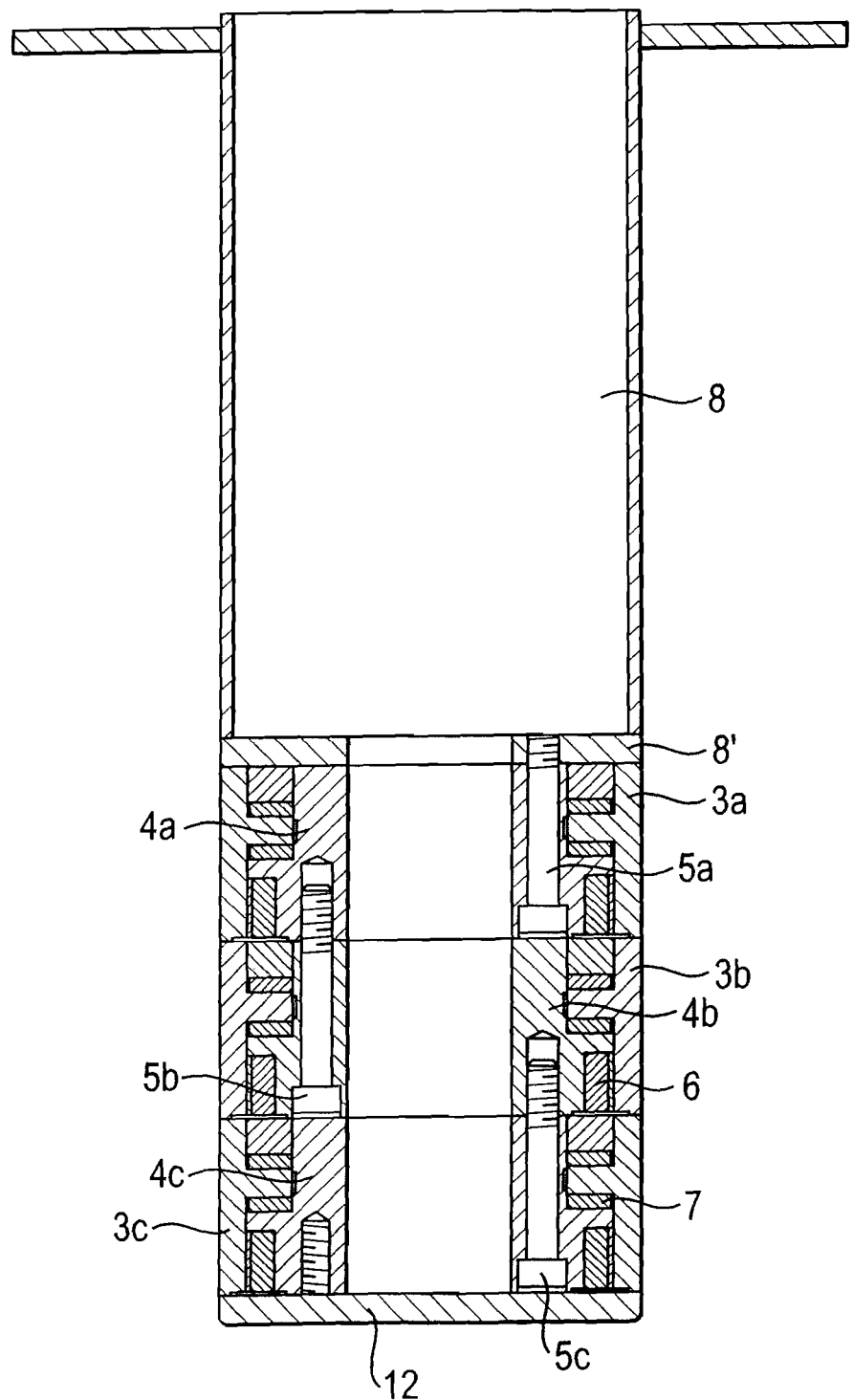

In the following, an embodiment of the invention will be described in detail with reference to the drawing; in which:

FIG. 1 schematically shows an apparatus for supporting operation theatre lamps with several cantilevers;

FIG. 2 is an exploded view of a portion of the apparatus according to FIG. 1, comprising one cantilever;

to FIG. 3 shows a section through a portion of the apparatus with three cantilevers installed; and FIG. 4 shows a section along line A-A in FIG. 3.

FIG. 1 schematically shows a portion of the ceiling of an operation theatre, which is identified with reference numeral 1. The point is to install several cantilevers 2a, 2b, 2c in such a way that the on site assembly offers as many different variation options as possible. The cantilevers and their installation only are illustrated and described. In addition to the cantilevers, spring arms may be attached at the ends of the cantilevers in the manner known per se (see also the above-referenced state of the art).

A vertical pillar 8 connects the cantilevers 2a, 2b, 2c with the ceiling 1. Below the vertical pillar, the cantilevers 2a, 2b, 2c are mounted by means of bearing heads 3a, 3b, 3c.

According to FIG. 2, each bearing head 3 comprises a means 10 for mounting a cantilever 2. FIG. 2 is also an exploded view of a shaft 4, connecting screws 5, slip rings 6, bearings 7 (e. g. needle bearings), and further components. The slip rings 6 serve for electrical contact-making and for position determining.

According to FIG. 2, one cantilever 2 is inserted into a collet 10' of the mounting means 10 by a few centimetres and is then secured at the bearing head 3 by means of a horizontally extending screw whose orientation is indicated by reference numeral 9. Four screws extend horizontally and engage with channels 11 in the cantilever. The cantilever 2 consists of aluminium and the screws thread into the wall of the channels 11 for fastening the cantilever 2 at the bearing head 3.

In this manner, the suitable cantilevers may be selected and installed on site from a choice of cantilevers 2 with different lengths.

FIG. 3 shows a vertical section through the arrangement according to FIG. 1, and FIG. 4 shows a section along line A-A in FIG. 3.

In the embodiment according to FIGS. 3 and 4, three shafts 4a, 4b, 4c are individually mounted one below the other. Each shaft carries a bearing head 3a, 3b, 3c. Instead of the illustrated three shafts and three bearing heads, fewer or more shafts and bearing heads may be installed. This means still further variation possibilities of the invention. FIG. 3 shows how the cantilevers 2a, 2b, 2c are inserted into collets 10' of the mounting means 10 of the respective bearing head.

FIG. 4 shows the assembly of the shafts 4a, 4b, 4c. First, the upper shaft 4a is secured at a lower end flange 8' of the vertical pillar 8 by means of a connecting screw 5a. Then, another shaft 4b with the associated bearing head 3b is secured at the shaft 4a above by means of the connecting screw 5b. Still another shaft 4c may be secured below the shaft 4b by means of the connecting screw 5c. Is can be seen that this assembly technique enables the selective installation of individual shafts and bearing heads, i. e. that two shafts with bearing head more than shafts with bearing head instead of the illustrated three shafts with one bearing head each may be installed as well. The apparatus is closed at its bottom by a cover plate 12.

The invention claimed is:

1. Apparatus for supporting a medical device, the apparatus comprising:
    a vertical pillar (8);
    several bearing heads (3a, 3b, 3c) which are mountable at the vertical pillar (8);
    one or more cantilevers (2, 2a, 2b, 2c), which are supported at one or more bearing heads; and
    means (4, 5) for mounting two or more bearing heads (3a, 3b, 3c) vertically one below the other; and
    several shafts (4a, 4b, 4c) corresponding to the several bearing heads (3a, 3b, 3c), respectively,
        wherein each of the several bearing heads (3a, 3b, 3c) is mounted on the corresponding shaft (4a, 4b, 4c) so as to be rotatable, wherein a top shaft of the several shafts is connected to the vertical pillar and each of the lower shafts (4b, 4c) is connected directly to a shaft (4a, 4b) arranged above it by means of connecting screws (5a, 5b, 5c) extending vertically from the shaft (4b, 4c) and inserting into the shaft (4a, 4b) arranged above it wherein each of the several shafts abuts an adjacent shaft;
        wherein the vertical pillar (8) is mountable at a ceiling of an operation theatre and that the medical device is an operation theatre lamp.

2. Apparatus according to claim 1 wherein the bearing heads each comprise a means (10) at which selectively cantilevers of various lengths are mounted.

3. Apparatus according to claim 2 wherein the means (10) at which selectively cantilevers of different length are mounted, comprise a collet (10') into which a cantilever (2) is introduced for a certain distance.

4. Apparatus according to claim 1 wherein a cantilever (2) is mounted at the bearing head (3) by means of screws (9) extending horizontally to engage with channels (11) in the cantilever (2).

5. Apparatus according to claim 1 wherein the one or more bearing heads each comprise a means (10) at which selectively cantilevers of various lengths are mounted.

6. Apparatus according to claim 5 wherein the means (10) at which selectively cantilevers of different length can be mounted, comprise a collet (10') into which a cantilever (2) is introduced for a certain distance.

7. Apparatus according to claim 1 wherein the means (10) at which selectively cantilevers of different length are mounted, comprise a collet (10') into which a cantilever (2) is introduced for a certain distance.

8. Apparatus according to claim 1 wherein a cantilever (2) are mounted at the bearing head (3) by means of screws (9) extending horizontally to engage with channels (11) in the cantilever (2).

9. Apparatus according to claim 2 wherein a cantilever (2) is mounted at the bearing head (3) by means of screws (9) extending horizontally.

10. Apparatus according to claim 3 wherein a cantilever (2) is mounted at the bearing head (3) by means of screws (9) extending horizontally to engage with channels (11) in the cantilever (2).

* * * * *